United States Patent Office 3,442,690
Patented May 6, 1969

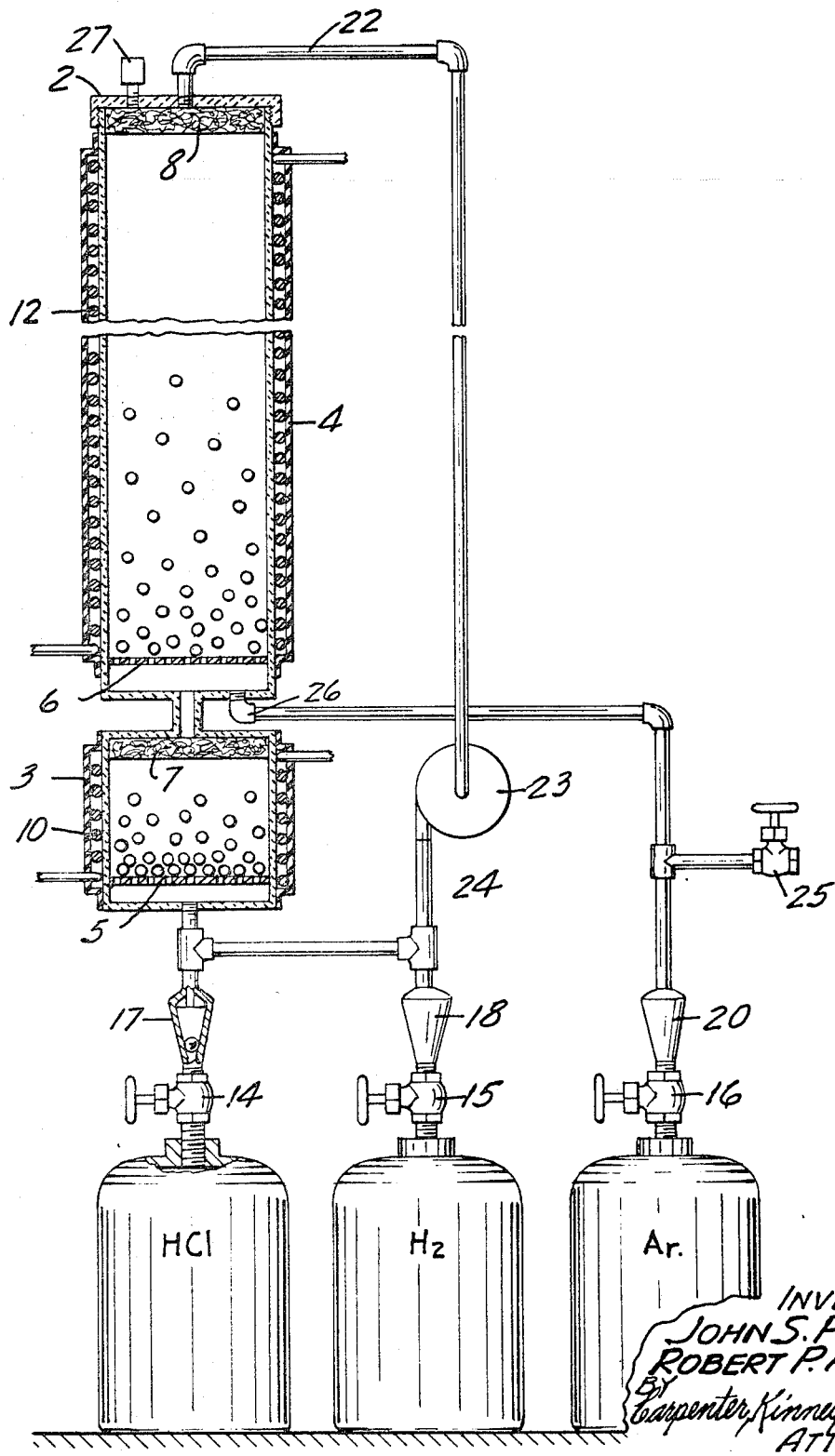

3,442,690
COATING SOLID PARTICLES WITH
REFRACTORY METALS
John S. Peake, North Oaks, and Robert P. Arens, St. Paul,
Minn., assignors to Minnesota Mining and Manufacturing Company, St. Paul, Minn., a corporation of
Delaware
Filed May 13, 1964, Ser. No. 367,253
Int. Cl. C23c 13/02
U.S. Cl. 117—100                              3 Claims

ABSTRACT OF THE DISCLOSURE

Process for coating materials with refractory metals in which volatile refractory metal halides are formed in a heated reaction chamber by the action of a gas mixture consisting of hydrogen and a hydrogen halide on the metal, the reaction mixture is passed into a heated coating chamber in which a fluidized bed of particles is coated by reduction of the refractory metal halide to the corresponding metal, and the hydrogen and hydrogen halide gases effluent from the coating chamber are directly recirculated to the reaction chamber. The process avoids the necessity for handling refractory metal halides and is very economical of materials.

---

This invention relates to the coating of solid particles and more particularly to the production of protective coatings on the surfaces of small particles, especially particles of refractory materials.

Particles of actinide carbides, such as uranium carbide, plutonium carbide and thorium carbide, as well as particles of graphite containing such actinide carbides, are useful as fuel for nuclear reactors. Likewise, particles of uranium oxide or other oxides, as such or dispersed in carbon or graphite, are useful for this purpose. Owing to the conditions under which they are used, however, such particulate material is subject to a number of adverse environmental conditions which may cause spalling, abrasion, fission product release, fusion of fuel materials, sintering of particles, etc. To prevent or at least mitigate these disadvantageous effects, protection of the surfaces, and containment of fission particles, are desirably accomplished by providing a protective surface coating over substantially the entire external surface of these particles.

Other types of solid particles are also usefully coated to enhance their properties. Thus, ceramic particles, such as, for example, porous ceramic materials composed of one or more oxides of the type of barium, zirconium, aluminum, beryllium, etc. may be used for the purposes of adsorbing radioisotopes. Such particles, as well as particles of fired clay containing radioisotopes, are usefully also protected by surface coatings as hereinafter disclosed. Likewise, carbon or graphite particles may be coated with refractory metals for special purposes.

For the purpose of providing protection for the surfaces of articles of the class described, it has heretofore been proposed that refractory meals, for example, niobium, tantalum, tungsten, zirconium, titanium, etc. be employed. The methods which have heretofore been used for this purpose have involved the use of volatile halides of these named metals, or vapor deposition of the metals themselves, using high vacua and high temperatures. While satisfactory coatings have been achieved in these ways, the procedures used heretofore for the purpose leave something to be desired. Difficult and inconvenient problems are involved in, for example, handling of these metal halides, their production in pure form, etc. So far as metal vapor deposition is concerned, it is somewhat difficult to achieve a uniform coating using this method because the maintenance of a fluidized bed is difficult in vacuo. Also, the metal deposits on the interior walls of the coating chamber and all fixtures therein and frequent cleaning is required.

It is an object of the present invention to provide a process for coating solid particles with refractory metals.

It is another object of the invention to provide a process whereby refractory metals as such are efficiently transported in a coating process to a deposition zone without the utilization of high vacua.

Other objects of the invention will become apparent from the disclosure hereinafter made.

In accordance with the above and other objects of the invention, a coating process is provided wherein particles of certain refractory metals of high purity are heated in the presence of hydrogen and a hydrogen halide to a temperature sufficient to produce volatile halides of the selected refractory metal. The resulting gaseous mixture is passed through a screen or other means for preventing the passage of particulate material, to a coating zone, where the particles to be coated are heated to a temperature sufficient to bring about reduction of the halides and deposition of the metal upon the external surfaces of the particles.

The process of the invention is highly advantageous in that it is never necessary to handle any of the metallic halides as such. Furthermore, it is not necessary to purify them, and no especial care is needed to insure that any particular halide of the various valence forms which may be produced is present. The process is in effect a transfer of metal by means of a carrier gas system. The process can be conducted at ordinary pressures and is considerably simplified over the use of a previously prepared metallic halide as in the ordinary processes of the art. Thus, there is no need to control vaporization of the solid metallic halide, which in a number of instances is in fact moisture sensitive and requires special handling conditions. There is no necessity for balancing the rate of vaporization with the flow rate of hydrogen or other reducing agent. The process is also very economical of materials used.

Advantageously, in the process of the invention, the carrier gas system employed is recirculated, thereby providing for operation in a completely enclosed system, as well as maximum efficiency.

Metals useful in the process of the invention are niobium, tantalum and the like. The temperatures employed vary according to the properties of the metal used, and of the halides which are selected. While hydrogen chloride and hydrogen bromide are equally satisfactory from the standpoint of transport of metals, hydrogen chloride is preferred.

The period of time employed for the coating process depends to some extent upon the size of batches which are employed, as well as the rate at which the metal is transported from the halide formation chamber to the coating chamber. Another factor is, of course, the thickness of the coating which is to be formed over the surface of the particles. However, once conditions have been established, the process is reproducible and empirical methods easily establish the requirements for producing coatings of any desired, predetermined thickness. It has been found that the process is extremely efficient and coats the substrate particles so effectively as actually to penetrate pores and grain boundaries which may be present. At the same time, a continuous, adherent coating is formed over the entire external surface of the particles.

The apparatus employed conveniently contains two chambers. These are independently heated so as to control the temperature at desired levels in each chamber, yet they have a common wall, having an opening for communication between them, in which a barrier to the passage of particulate material is ordinarily provided. Because of the high temperatures to be employed, the apparatus is made of refractory material, which of course, is also required to be inert to hydrogen halide vapors, hydrogen and the metals employed.

In operation, finely divided metal to be used for coating is placed in a first chamber, which is provided with heating means an inlet means for hydrogen and hydrogen halide vapors. The chamber is heated sufficiently to produce volatile metallic halides, and a continuous flow of hydrogen and the hydrogen halide is instituted, so that the mixture of gases will pass through the barrier into the second chamber, where the particles to be coated are maintained as a fluidized bed. This can be accomplished by the passage of an inert gas, for example, argon, through the particles, or by vibration, etc.

The gaseous mixture from the halide-forming chamber is brought into contact with the fluidized bed, while maintaining the second zone of the apparatus at a sufficiently high temperature to bring about reduction of the metallic halide to metal, whereupon it deposits upon the surface of the particles. A continuous circulation of the hydrogen, hydrogen halide and fluidizing gases can, if desired, be carried on. When continuous circulation of gases is provided, proper adjustment of flow, once operation is stabilized, can give the result that the heat from the off-gases of the coating chamber suffices to keep the metallic halide forming chamber at proper temperature, with only slight addition of external heat.

The invention is further illustrated by the drawing, in which is shown schematically with portions broken away or shown in cross-section to show the interior thereof, a vertical tube furnace 2 having adjacent and connected chambers 3 for generation of niobium chloride in situ and 4 for coating particles in a fluidized bed operation and provided with particle supporting screens 5 and 6, respectively. Quartz wool-filters 7 and 8 are provided for preventing the passage of dust or particles into the connecting piping. The furnace chambers are heated by electrical coils 10 and 12, with appropriate connections to an external source of electric power, not illustrated. Conventional means (not shown) are provided for determining temperatures in each chamber. The furnace chambers are conventionally insulated against heat loss, and are constructed of refractory material suitable for withstanding temperatures of the order of 1000–1200° C. and resistant to the action of hydrogen chloride and hydrogen at these temperatures. Tanks containing hydrogen chloride, hydrogen and argon are provided as shown, which are connected by piping to the furnace through valves 14, 15 and 16, respectively. Flow meters 17, 18 and 20 are provided for monitoring the flow of hydrogen chloride, hydrogen and argon, respectively. The gas cylinders for hydrogen chloride and hydrogen are connected to chamber 3 of the furnace through appropriate conduits as shown, the argon cylinder being connected to coating chamber 4 by means of conduit and fitting 26 to provide inert fluidizing gas if desired. A recirculating system, consisting of pipe 22 extending from the top of chamber 4 to circulating pump 23, and return pipe 24 to niobium chloride generating chamber 4 provides for reintroduction of recirculated gases into the system. A valve 25 is provided for venting the system. Relief or venting valve 27 is provided for relief of excess pressure, if recirculation is used, or to vent the fluidizing and spent gases to the atmosphere if simple fluidized bed operation is practiced.

The following examples will more specifically illustrate the process of the invention and the useful results obtained thereby.

EXAMPLE 1

A vertical tube furnace is arranged to have adjacent, independently heated and controlled cylindrical chambers of fused silica about one-half inch in diameter and eight inches in length, between which chambers a partition of graphite having numerous small holes (approximately 15 mils) through it serves as a barrier to the passage of solid particles. In the first (lower) of said chambers are placed 19.62 grams of granular niobium metal of approximately 10 to 40 mesh. An inlet tube for argon serves to provide for fluidization of particles in the second chamber. In the second chamber are placed 238.18 grams of 9–20 mesh "W Graphite" (obtained from Graphite Specialties Company). The first, niobium containing chamber (reaction zone) is heated to a temperature in the range of about 625 to 640° C., and at the same time a carrier gas composed of 9 parts of purified hydrogen and one part of purified hydrogen chloride is passed through the furnace at the rate of about 60 standard cm.$^2$ per minute. The graphite particle-containing upper chamber (deposition zone) is maintained in the range of about 1039–1053° C. Heating and passage of the gases are continued for about 10¾ hours at such a rate that during that period, 13.8 gram moles of hydrogen chloride pass through the furnace for every gram atom of niobium present. During the passage of the gases, volatile niobium halides are formed in the reaction zone, and are conducted through the barrier by the carrier gas and reduced to niobium metal on the graphite particles, coating these particles so effectively as to penetrate their pores and grain boundaries. During the duration of the run, 15.1 grams of niobium are volatilized. Each of the graphite particles is substantially completely covered on its external surfaces with niobium metal, as shown by microscopic examination of samples. The coating is about 5 microns thick, and is dense and adherent.

EXAMPLE 2

A two-chamber furnace as described above is employed, using, however, a barrier of quartz wool in place of the carbon barrier or partition having small holes in it. About 53 parts of −60 mesh niobium metal are placed in the first chamber, which is maintained in the temperature range of 630–660° C. and about 5 grams of spherical particles of uranium carbide about 50 microns in diameter are placed in the second (coating) chamber, which is heated to a temperature in the range of about 1030–1060° C. The carrier gas, consisting of about 2 parts by volume of purified hydrogen and one part by volume of purified hydrogen chloride, is then introduced into the first chamber, where niobium halides are formed and volatilized, and the resulting reaction mixture is passed through the quartz wool barrier into the coating chamber, where niobium is deposited over substantially all of the surfaces of the uranium carbide spheres. During the coating, which continues for about 3–10 hours, the bed of spheres is fluidized by vibrating the tube with an electrically operated vibrator, to prevent the particles from sticking together. A substantially uniform, continuous coating of niobium is formed over the entire outer surface of the uranium carbide spherules. Longer coating times form increasingly thicker, but still dense and adherent coatings of niobium on the particles.

EXAMPLE 3

The process of Example 1 is repeated, except that powdered tantalum metal is employed. Essentially the same results are found, except that a coating of tantalum is produced on the exterior surface of the spherular particles.

Other examples of solid particles usefully coated by the process of the invention are the radioactive materials such as strontium 90 titanate, and particles containing ion-exchanged or adsorbed radioisotopes such as those described in U.S. Patent No. 2,918,700, or as described in British Patent No. 917,649.

In every case, as will be appreciated by those skilled in the art, the radioactivity of the particles must be considered and suitable precautions for safety, not detailed in these examples, must be taken Likewise, of course, fissionable materials must be treated accordingly. Such measures are not a part of the process of the invention but are important to all operations with materials of the type described.

We claim:

1. A process for the coating of solid particles with refractory metal, which comprises heating a metal of the group consisting of niobium and tantalum in a reaction chamber in the presence of hydrogen and a hydrogen halide having molecular weight between 36 and 82 to a temperature sufficient to provide volatile halide of refractory metal in gaseous form, conducting the reaction mixture containing the said volatile halide into a coating chamber containing particles to be coated and contacting the particles with said mixture at a temperature sufficient to cause decomposition of the said refractory metal halide to the corresponding metal for a time sufficient to coat the said particles with the said metal over substantially the entire external surface thereof and recirculating the effluent gases from the coating chamber directly to the said reaction chamber.

2. A process for the coating of solid particles with refractory metal, which comprises heating finely divided niobium in the presence of hydrogen and hydrogen chloride in a reaction chamber to a temperature sufficient to produce volatile chloride of niobium in gaseous form, conducting the reaction mixture containing the said volatile chloride into a coating chamber containing particles to be coated and contacting the particles with said mixture at a temperature sufficient to cause decomposition to niobium for a time sufficient to coat the said particles with niobium over substantially the entire external surface thereof and recirculating the effluent gases from the coating chamber directly to the said reaction chamber.

3. A process for the coating of solid particles with refractory metals, which comprises heating finely divided tantalum in the presence of hydrogen and hydrogen chloride in a reaction chamber to a temperature sufficient to produce volatile chloride of tantalum in gaseous form, conducting the reaction mixture containing the said volatile chloride into a coating chamber containing partcles to be coaied and contacting the particles with said mixture at a temperature sufficient to cause decomposition to tantalum for a time sufficient to coat the said particles with tantalum over substantially the entire exernal surface thereof and recirculating the effluent gases from the coating chamber directly to the said reaction chamber.

References Cited

UNITED STATES PATENTS

| 2,604,395 | 7/1952 | Gonser et al. | 75—84.5 |
| 3,085,855 | 4/1963 | Sutherland et al. | 23—87 |
| 3,177,067 | 4/1965 | Nichols | 75—84.5 |
| 3,178,308 | 4/1965 | Oxley et al. | 117—107.2 |
| 3,202,537 | 8/1965 | Norman et al. | 117—107.2 |
| 3,205,042 | 9/1965 | Jacobson. | |
| 3,211,548 | 10/1965 | Scheller et al. | 117—107.2 |
| 3,216,822 | 11/1965 | Brothers et al. | 75—84.5 |

FOREIGN PATENTS 657,309    2/1963    Canada.

WILLIAM D. MARTIN, *Primary Examiner.*

E. J. CABIC, *Assistant Examiner.*

U.S. Cl. X.R.

75—84.4, 85.5; 117—107.2